United States Patent
Zhang

(10) Patent No.: US 10,225,878 B2
(45) Date of Patent: Mar. 5, 2019

(54) METHOD AND SYSTEM FOR DISPLAYING WEARABLE DEVICE DISPLAY INFORMATION

(71) Applicant: Huizhou TCL Mobile Communication Co., LTD, Hui Zhou (CN)

(72) Inventor: Jie Zhang, Hui Zhou (CN)

(73) Assignee: HUIZHOU TCL MOBILE COMMUNICATION CO., LTD, Hui Zhou (CN)

( * ) Notice: Subject to any disclaimer, the term of this patent is extended or adjusted under 35 U.S.C. 154(b) by 0 days.

(21) Appl. No.: 15/563,590

(22) PCT Filed: Sep. 8, 2016

(86) PCT No.: PCT/CN2016/098441
§ 371 (c)(1),
(2) Date: Sep. 30, 2017

(87) PCT Pub. No.: WO2017/059756
PCT Pub. Date: Apr. 13, 2017

(65) Prior Publication Data
US 2018/0206281 A1 Jul. 19, 2018

(30) Foreign Application Priority Data
Oct. 10, 2015 (CN) .......................... 2015 1 0655565

(51) Int. Cl.
*H04W 4/80* (2018.01)
*H04W 76/15* (2018.01)
*H04B 13/00* (2006.01)
*G06F 3/01* (2006.01)

(52) U.S. Cl.
CPC .............. *H04W 76/15* (2018.02); *G06F 3/01* (2013.01); *H04B 13/005* (2013.01); *H04W 4/80* (2018.02)

(58) Field of Classification Search
CPC ..................................................... H04B 13/005
See application file for complete search history.

(56) References Cited

U.S. PATENT DOCUMENTS 6,754,472 B1 6/2004 Williams et al.
2015/0341901 A1* 11/2015 Ryu .................. H04M 1/72569
455/458

(Continued)

FOREIGN PATENT DOCUMENTS

| CN | 104267811 A | 1/2015 |
| CN | 104394061 A | 3/2015 |
| CN | 104917877 A | 9/2015 |

(Continued)

*Primary Examiner* — Simon Nguyen
(74) *Attorney, Agent, or Firm* — Shimokaji IP

(57) ABSTRACT

A method and system for displaying wearable device display information may include: a master wearable device detecting whether a user has put on a slave wearable device via a body transmission channel; if yes, the master wearable device transmits the device display information of the slave wearable device to a handheld terminal; the handheld terminal establishes a wireless communication link with the slave wearable device; when determining that a priority of the slave wearable device is higher than a priority of the master wearable device, the handheld terminal transmits the display information to the slave wearable device for display.

20 Claims, 3 Drawing Sheets

(56) References Cited

U.S. PATENT DOCUMENTS

2016/0036953 A1* 2/2016 Lee .................. H04M 1/576
                                              455/426.1
2017/0289329 A1* 10/2017 Yim .................. G06F 3/048

FOREIGN PATENT DOCUMENTS

| CN | 105302300 A | 2/2016 |
|----|-------------|--------|
| CN | 105354161 A | 2/2016 |

* cited by examiner

METHOD AND SYSTEM FOR DISPLAYING WEARABLE DEVICE DISPLAY INFORMATION

FIELD OF THE INVENTION

The present invention relates to the field of communication technologies, and in particular to a method and a system for displaying wearable device display information.

DESCRIPTION OF THE RELATED ART

Along with technology development, electronic devices, in particular wearable devices, are increasingly widely used. As wearable devices are light and portable, they are increasingly popular among the public. As wearable devices become common on the market, there are many types of wearable devices available. Many users may put on multiple wearable devices, and the most commonly ones may be smart watches and smart glasses.

Generally, both smart watches and smart glasses can display information. When a user puts on one wearable device, the display information may only be displayed on the wearable device on the user. When a user puts on multiple wearable devices, the user may need to manually set up a wearable device to display information. When a user wears a smart watch, the display information may only be displayed on the smart watch; when a user wears a smart watch and a pair of smart glasses at the same time, it may be necessary for the user to manually set up whether the display information is displayed on the smart watch or the smart glasses. As it may require a manual operation to display the display information on a wearable device, and as the operation may be complicated, a user may tend to get a poor experience.

Therefore a method and a system for displaying wearable device display information is needed to solve the above problem.

SUMMARY OF THE INVENTION

The technical problem that the present invention primarily solves is to provide a method and a system for displaying wearable device display information, which can improve the user experience.

To solve the above technical problem, an embodiment of the present invention is as follows: providing a system for displaying wearable device display information, comprising a master wearable device, a handheld terminal, and a slave wearable device, the master wearable device being worn on the user body, the master wearable device comprising a first bus, a first memory, a first processor, a first communication interface, and a first monitor, the first memory, the first processor, the first communication interface, and the first monitor being connected to the first bus, respectively, the slave wearable device comprising a second bus, a second memory, a second processor, a second communication interface, and a second monitor, the second memory, the second processor, the second communication interface, and the second monitor being connected to the second bus, respectively, the handheld terminal comprising a third bus, a third memory, a third processor, and a third communication interface, the third memory, the third processor, and the third communication interface being connected to the third bus, respectively, the first memory storing a first program command, the first processor being configured to execute the first program command, the second memory storing a second program command, the second processor being configured to execute the second program command, the third memory storing a third program command, the third processor being configured to execute the third program command, and both the first communication interface and the second communication interface being in contact with skin to ensure the openness of a body transmission channel, wherein: a first wireless communication link is established between the first communication interface and the third communication interface;

The first processor executes the first program command to control the first communication interface to detect whether a user has put on the slave wearable device via a body transmission channel formed within the user body;

When the first processor executes the first program command and determines that the user has put on the slave wearable device, the first communication interface can acquire the device information of the slave wearable device from the second communication interface via the body transmission channel, and can transmit the device information to the third communication interface via the first wireless communication link;

The third processor can execute the third program command to, when the third communication interface receives the device information, establish a second wireless communication link between the third communication interface and the second communication interface according to the device information;

The third processor can execute the third program command to determine priority of the master wearable device and the slave wearable device;

When the third processor executes the third program command to determine that the priority of the slave wearable device is higher than the priority of the master wearable device, the third communication interface transmits the display information to be displayed to the second communication interface via the second wireless communication link;

The second processor can execute the second program command such that the second monitor displays the display information when the second communication interface receives the display information;

When the first processor executes the first program command and determines that the user has put on the slave wearable device, the first communication interface further transmits handshake information to the second communication interface regularly via the body transmission channel;

The second processor can execute the second program command such that the second communication interface transmits answer information corresponding to the handshake information to the first communication interface via the body transmission channel;

The first wireless communication link and the second wireless communication link may be Bluetooth links.

When the first processor executes the first program command and when no corresponding answer information is received after the first communication interface transmits the handshake information, the first processor confirms that the user has taken off the slave wearable device;

When the first processor confirms that the user has taken off the slave wearable device, the first communication interface transmits switching information to the third communication interface via the first wireless communication link;

The third processor can execute the third program command to transmit the display information to be displayed to the first communication interface via the first wireless communication link according to the switching information;

The first monitor displays the display information. The master wearable device may be a smart watch, and the slave wearable device may be a pair of smart glasses.

An embodiment is as follows: providing a system for displaying wearable device display information, comprising a master wearable device, a handheld terminal, and a slave wearable device, the master wearable device being worn on the user body, the master wearable device comprising a first bus, a first memory, a first processor, a first communication interface, and a first monitor, the first memory, the first processor, the first communication interface, and the first monitor being connected to the first bus.

The slave wearable device comprising a second bus, a second memory, a second processor, a second communication interface, and a second monitor, the second memory, the second processor, the second communication interface, and the second monitor being connected to the second bus, respectively, the handheld terminal comprising a third bus, a third memory, a third processor, and a third communication interface, the third memory, the third processor, and the third communication interface being connected to the third bus, respectively, the first memory storing a first program command, the first processor being configured to execute the first program command, the second memory storing a second program command, the second processor being configured to execute the second program command, the third memory storing a third program command, and the third processor being configured to execute the third program command, wherein:

A first wireless communication link is established between the first communication interface and the third communication interface;

The first processor executes the first program command to control the first communication interface to detect whether a user has put on the slave wearable device via a body transmission channel formed within the user body;

When the first processor executes the first program command and determines that the user has put on the slave wearable device, the first communication interface can acquire the device information of the slave wearable device from the second communication interface via the body transmission channel, and transmit the device information to the third communication interface via the first wireless communication link;

The third processor executes the third program command, when the third communication interface receives the device information, to establish a second wireless communication link between the third communication interface and the second communication interface according to the device information;

The third processor executes the third program command to determine priority of the master wearable device and the slave wearable device;

When the third processor executes the third program command to determine that the priority of the slave wearable device is higher than the priority of the master wearable device, the third communication interface transmits the display information to be displayed to the second communication interface via the second wireless communication link;

The second processor can execute the second program command such that the second monitor displays the display information when the second communication interface receives the display information.

When the first processor executes the first program command and determines that the user has put on the slave wearable device, the first communication interface further transmits handshake information to the second communication interface regularly via the body transmission channel;

The second processor executes the second program command such that the second communication interface transmits answer information corresponding to the handshake information to the first communication interface via the body transmission channel.

When the first processor can execute the first program command and when no corresponding answer information transmitted by the second communication interface is received after the first communication interface transmits the handshake information, the first processor can confirm that the user has taken off the slave wearable device;

When the first processor confirms that the user has taken off the slave wearable device, the first communication interface can transmit switching information to the third communication interface via the first wireless communication link;

The third processor can execute the third program command to transmit the display information to be displayed to the first communication interface via the first wireless communication link according to the switching information;

The first monitor displays the display information. The first wireless communication link and the second wireless communication link may be Bluetooth links. The master wearable device can be a smart watch, and the slave wearable device may be a pair of smart glasses.

An embodiment is as follows: providing a method for displaying wearable device display information, said method being applied to a master wearable device, a handheld terminal, and a slave wearable device, the master wearable device being worn on the user body, and a first wireless communication link being established between the master wearable device and the handheld terminal, said method comprising: the master wearable device detects whether a user has put on the slave wearable device via a body transmission channel formed within the user body; when the master wearable device determines that the user has put on the slave wearable device, it acquires the device information of the slave wearable device from the slave wearable device via the body transmission channel, and transmits the device information to the handheld terminal via the first wireless communication link; upon receipt of the device information, the handheld terminal establishes a second wireless communication link with the slave wearable device according to the device information; the handheld terminal determines priority of the master wearable device and the slave wearable device, and when determining that the priority of the slave wearable device is higher than the priority of the master wearable device, transmits the display information to be displayed to the slave wearable device via the second wireless communication link; the slave wearable device displays the display information on its own monitor.

When determining that the user has put on the slave wearable device, the master wearable device can further transmit handshake information to the slave wearable device regularly via the body transmission channel, and the slave wearable device can transmit answer information corresponding to the handshake information to the master wearable device via the body transmission channel.

When no corresponding answer information is received after the master wearable device transmits the handshake information, the master wearable device can confirm that the user has taken off the slave wearable device, and transmit switching information to the handheld terminal, the handheld terminal can transmit the display information to be displayed to the master wearable device via the first wireless communication link according to the switching information, and the master wearable device can display the display information on its own monitor.

The first wireless communication link and the second wireless communication link may be Bluetooth links.

The master wearable device may be a smart watch, and the slave wearable device may be a pair of smart glasses.

Advantageous effects of the examples of the present invention may include: unlike the prior art, the method for displaying wearable device display information of the present invention comprises: a master wearable device detects whether a user has put on a slave wearable device via a body transmission channel formed within the user body; when the master wearable device determines that the user has put on the slave wearable device, it can acquire the device information of the slave wearable device from the slave wearable device via the body transmission channel, and transmit the device information to the handheld terminal via the first wireless communication link; upon receipt of the device information, the handheld terminal establishes a second wireless communication link with the slave wearable device according to the device information; the handheld terminal can determine priority of the master wearable device and the slave wearable device, and when the priority of the slave wearable device is higher than the priority of the master wearable device, transmit the display information to be displayed to the slave wearable device via the second wireless communication link; the slave wearable device can display the display information on its own monitor. In the way described above, the present invention can automatically display display information on a wearable device having the highest priority, which can greatly improve the flexibility of display for wearable devices and can effectively improve the user experience.

DETAILED DESCRIPTION OF THE SPECIFIC EMBODIMENTS

To make the technical problem, technical solutions and advantageous effects of the present invention clearer and more specific, the present invention will be further described in detail below with reference to the accompanying drawings and embodiments. It should be understood that the specific embodiments described herein are only used to explain the present invention, not used to limit the present invention.

Figure 1:
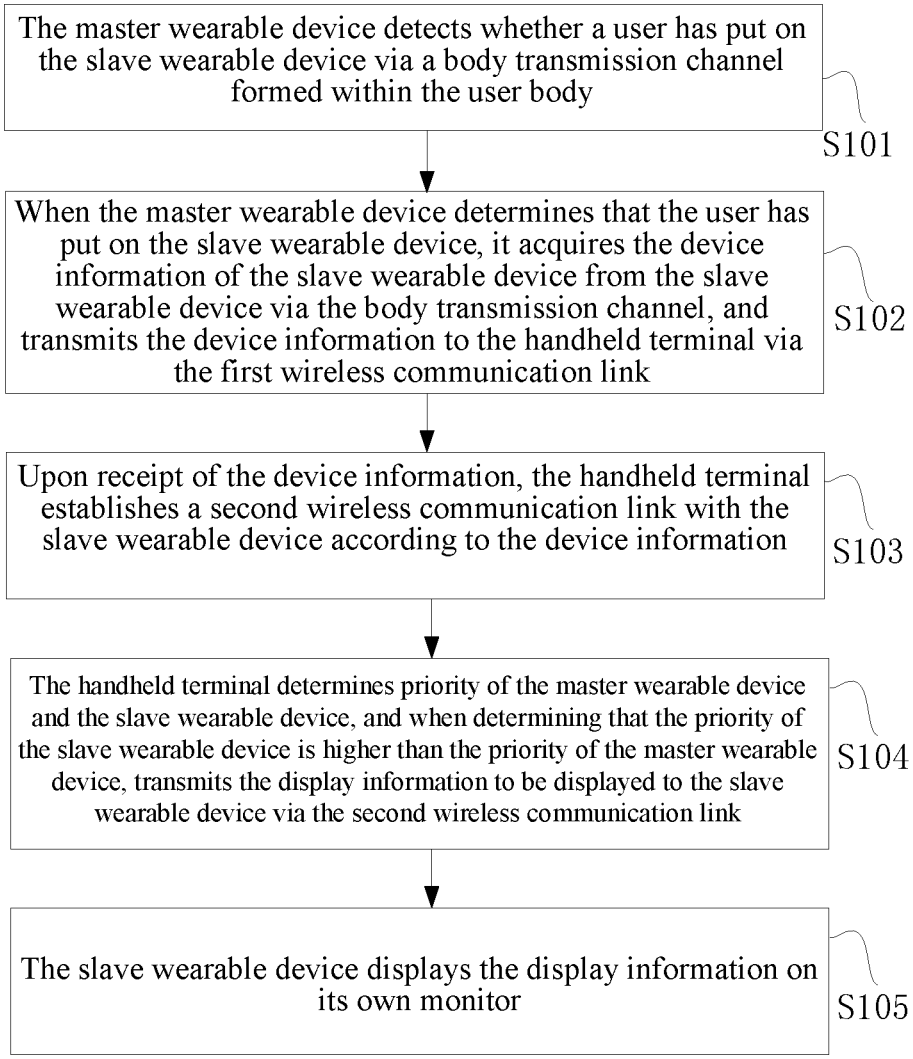
FIG. 1 is a flow chart of the method for displaying wearable device display information according to an embodiment of the present invention.

FIG. 1 is a flow chart of the method for displaying wearable device display information according to the present invention. Said method is applied to a master wearable device, a handheld terminal, and a slave wearable device, and may comprise the following steps:

Step S101: the master wearable device detects whether a user has put on the slave wearable device via a body transmission channel formed within the user body.

In an embodiment, the master wearable device is worn on the user body, the master wearable device and the slave wearable device use the human body as a transmission medium, therefore, the master wearable device can transmit data via the human body, such as via skin, muscle or blood, and the slave wearable device can similarly transmit data via the human body, such as via skin, muscle or blood. When a user puts on the slave wearable device, the shell of the master wearable device that is in contact with the human body forms a body transmission channel within the human body with the shell of the slave wearable device that is in contact with the human body, and consequently the master wearable device can detect whether a user has put on the slave wearable device.

In Step S101, the master wearable device can transmit handshake information to the slave wearable device regularly via the body transmission channel, and if a user has put on the slave wearable device, the slave wearable device can receive the handshake information and feed answer information back to the master wearable device, the master wearable device determines that the user has put on the slave wearable device, and the master wearable device and the slave wearable device can establish a body transmission channel; if the master wearable device does not receive answer information, the master wearable device can determine that the user has not put on the slave wearable device. When a user puts on the slave wearable device, the master wearable device may not receive answer information due to errors. To improve the accuracy, therefore, the master wearable device can determine that the user has put on the slave wearable device if the answer information is received for more than a preset number of times within a preset time.

Step S102: when the master wearable device determines that the user has put on the slave wearable device, it can acquire the device information of the slave wearable device from the slave wearable device via the body transmission channel, and transmit the device information to the handheld terminal via the first wireless communication link.

In an embodiment, the first wireless communication link can be established between the master wearable device and the handheld terminal. The first wireless communication link can be a Bluetooth link. The master wearable device may be a smart watch, the slave wearable device may be a pair of smart glasses, and the handheld terminal may be a cell phone. Before Step S101, the handheld terminal can transmit the display information to the master wearable device, the master wearable device can display the display information on its own monitor, when it is detected that the user has put on the slave wearable device, the handheld terminal switches to transmit the display information to the slave wearable device, such that the slave wearable device displays the display information on its own monitor.

As the smart glasses are closer to a user's eyes, the user can clearly see the display information after putting on the smart glasses. The master wearable device and the slave wearable device may also be other wearable devices, and the handheld terminal may also be other electronic devices.

Step S103: upon receipt of the device information, the handheld terminal can establish a second wireless communication link with the slave wearable device according to the device information.

The device information may comprise an identification number of the slave wearable device. Upon receipt of the device information, the handheld terminal can look up the identification number of the specific slave wearable device, and establish a second wireless communication link. The second wireless communication link may be a Bluetooth link.

Step S104: the handheld terminal can determine priority of the master wearable device and the slave wearable device, and when determining that the priority of the slave wearable device is higher than the priority of the master wearable device, the handheld terminal can transmit the display information to be displayed to the slave wearable device via the second wireless communication link.

In an present embodiment, the priority of the smart glasses may be higher than the priority of the smart watch. In another embodiment, the priority of the master wearable device may also be higher than the priority of the slave wearable device.

In Step S104, the display information to be displayed may comprise the information that the handheld terminal needs to display and/or the information that the master wearable device needs to display. The display information transmitted via the second wireless communication link may have relatively large size, such as, for example, videos. The transmission rate of display information via the second wireless communication link may be relatively high. In another embodiment, the handheld terminal may further transmit the display information to be displayed to the master wearable device via the first wireless communication link, and the master wearable device may transmit the display information to the slave wearable device via the body communication loop. The display information transmitted via said pathway can have a small size, such as photos, audio or small files, and the requirement for transmission rate may be low.

Step S105: the slave wearable device can display the display information on its own monitor.

In Step S105, when no corresponding answer information is received after the master wearable device transmits the handshake information, the master wearable device can confirm that the user has taken off the slave wearable device, and can transmit switching information to the handheld terminal. The handheld terminal can transmit the display information to be displayed to the master wearable device via the first wireless communication link according to the switching information, and the master wearable device can display the display information on its own monitor.

After the slave wearable device displays the display information on its own monitor, the master wearable device can further transmit handshake information to the slave wearable device regularly via the body transmission channel, and if the user continues to wear the slave wearable device, the slave wearable device transmits answer information corresponding to the handshake information to the master wearable device via the body transmission channel; if the user does not wear the slave wearable device, the master wearable device may not receive answer information, and at this moment, the master wearable device displays the display information on its own monitor. For example, when the master wearable device does not receive answer information, and still fails after having repeated the attempt for a number of times, it is concluded that the slave wearable device has been taken off, and it is switched to the default that the master wearable device displays the display information. Alternatively, when it is confirmed that the slave wearable device has been taken off, the handheld terminal may determine priority of the master wearable device and the handheld terminal, and if determining that the priority of the master wearable device is higher, the handheld terminal may transmit the display information to be displayed, via the first wireless communication link, to the master wearable device for display; if the priority of the handheld terminal is higher, the handheld terminal may display the display information to be displayed.

Figure 2:
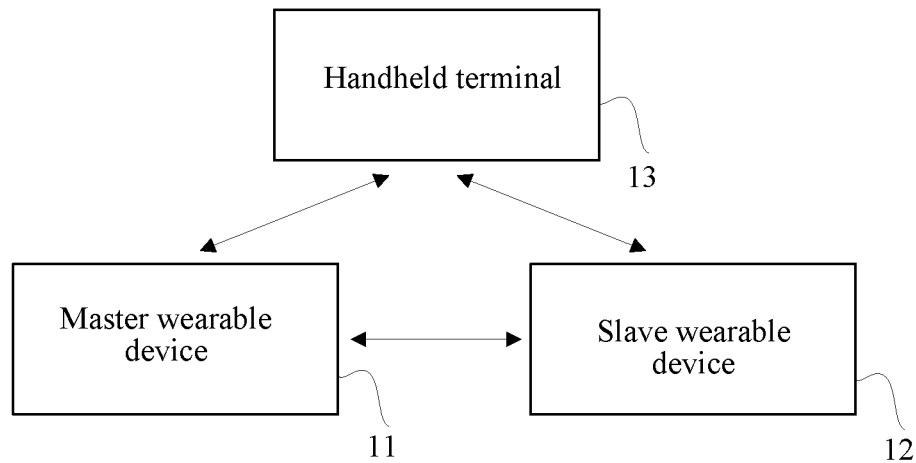
FIG. 2 is a schematic diagram of the structure of the system for displaying wearable device display information according to an embodiment of the present invention.

FIG. 2 is a schematic diagram of the structure of the system for displaying wearable device display information and the system in FIG. 2 corresponds to the method in FIG. 1. The system comprises a master wearable device 11, a slave wearable device 12, and a handheld terminal 13. The master wearable device may be worn on the user's body, the master wearable device 11 and the slave wearable device 12 can perform data transmission via a body transmission channel A first wireless communication link can be established between the master wearable device 11 and the handheld terminal 13, and a second wireless communication link between the slave wearable device 12 and the handheld terminal 13. In an embodiment, the master wearable device may be a smart watch, the slave wearable device may be a pair of smart glasses, and the handheld terminal 13 may be a cell phone. The master wearable device and the slave wearable device may also be other wearable devices, and the handheld terminal 13 may also be other electronic devices.

Figure 3:
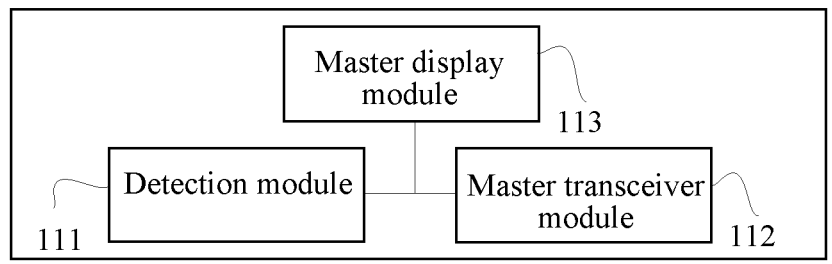
FIG. 3 is a schematic diagram of the structure of the master wearable device according to the embodiment of the present invention in FIG. 2.
Figure 4:
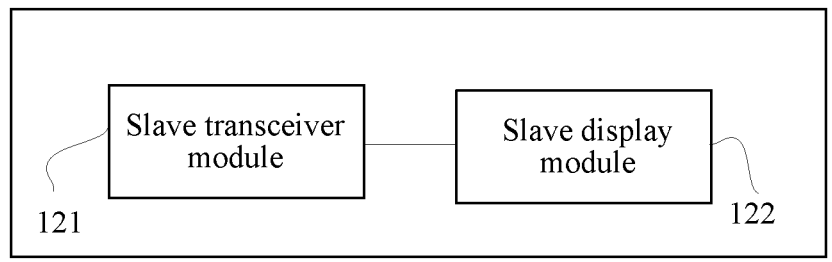
FIG. 4 is a schematic diagram of the structure of the slave wearable device according to the embodiment of the present invention in FIG. 2.
Figure 5:
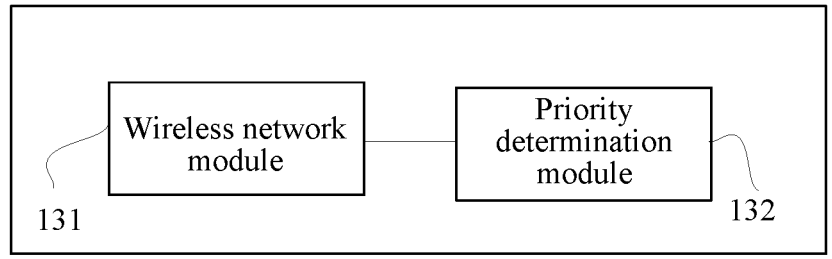
FIG. 5 is a schematic diagram of the structure of the handheld terminal according to the embodiment of the present invention in FIG. 2.

As shown in FIG. 3 to FIG. 5, the master wearable device 11 comprises a detection module 111, a master transceiver module 112, and a master display module 113, the slave wearable device 12 comprises a slave transceiver module 121 and a slave display module 122, and the handheld terminal 13 comprises a wireless network module 131 and a priority determination module 132.

A first wireless communication link can be established between the master transceiver module 112 and the wireless network module 131.

The detection module 111 can be configured to detect whether a user has put on the slave wearable device 12 via a body transmission channel formed within the user's body. The detection module 111 can be further configured to, when determining that the user has put on the slave wearable device 12, further transmit handshake information to the slave wearable device 12 regularly via the body transmission channel. The detection module 111 can be further configured to, upon receiving corresponding answer information after the handshake information is transmitted, determine that the user has put on the slave wearable device 12. The detection module 111 can be further configured to, when no corresponding answer information is received after the handshake information is transmitted, confirm that the user has taken off the slave wearable device 12.

When the detection module 111 determines that the user has put on the slave wearable device, the master transceiver module 112 can acquire the device information of the slave wearable device 12 from the slave wearable device 12 via the body transmission channel, and transmit the device information to the wireless network module 131 via the first wireless communication link.

The wireless network module 131 can be configured to, upon receipt of the device information, establish a second wireless communication link with the slave transceiver module 121 according to the device information. In an embodiment, the first wireless communication link and the second wireless communication link are Bluetooth links.

The priority determination module 132 can be configured to determine priority of the master wearable device 11 and the slave wearable device 12. In an embodiment, the priority of the smart glasses is higher than the priority of the smart watch.

The wireless network module 131 can be further configured to, when the priority determination module 132 determines that the priority of the slave wearable device 12 is higher than the priority of the master wearable device 11, transmit the display information to be displayed to the slave wearable device 12 via the second wireless communication link.

Upon receiving the display information from the slave transceiver module 121, the slave display module 122 can display the display information. Moreover, the slave transceiver module 121 is further configured to transmit answer information corresponding to the handshake information to the master wearable device 11 via the body transmission channel.

The master transceiver module 112 is configured to, when the detection module 111 confirms that the user has taken off the slave wearable device 12, transmit switching information to the wireless network module 131 via the first wireless communication link. The wireless network module 131 transmits the display information to be displayed to the master display module 113 via the first wireless communication link according to the switching information. The master display module 113 displays the display information.

In an embodiment, the master transceiver module 112 and the slave transceiver module 121 are both provided with a sensing region, said sensing regions are both disposed on the side of the shell that is in contact with skin to ensure the openness of a body transmission channel. Specifically, the sensing region of the smart glasses is disposed on a nose support of the frame and is in contact with face skin, preferably, the sensing region is disposed on the nose support of the frame and is in contact with the skin of nose bridge, which can accurately determine whether a user has truly put on the smart glasses. On the other hand, the sensing region of the smart watch is disposed on the face of the watch band that is in contact with skin to ensure the openness of a body transmission channel.

The master wearable device 11 may further comprise a master body communication module (not shown) configured to perform data transmission via the human body. The slave wearable device 12 may further comprise a slave body communication module (not shown) configured to perform data transmission via the human body. The master body communication module and the slave body communication module can form a body transmission channel within the human body for data transmission. The master body communication module and the slave body communication module both comprise body communication chips.

Figure 6:
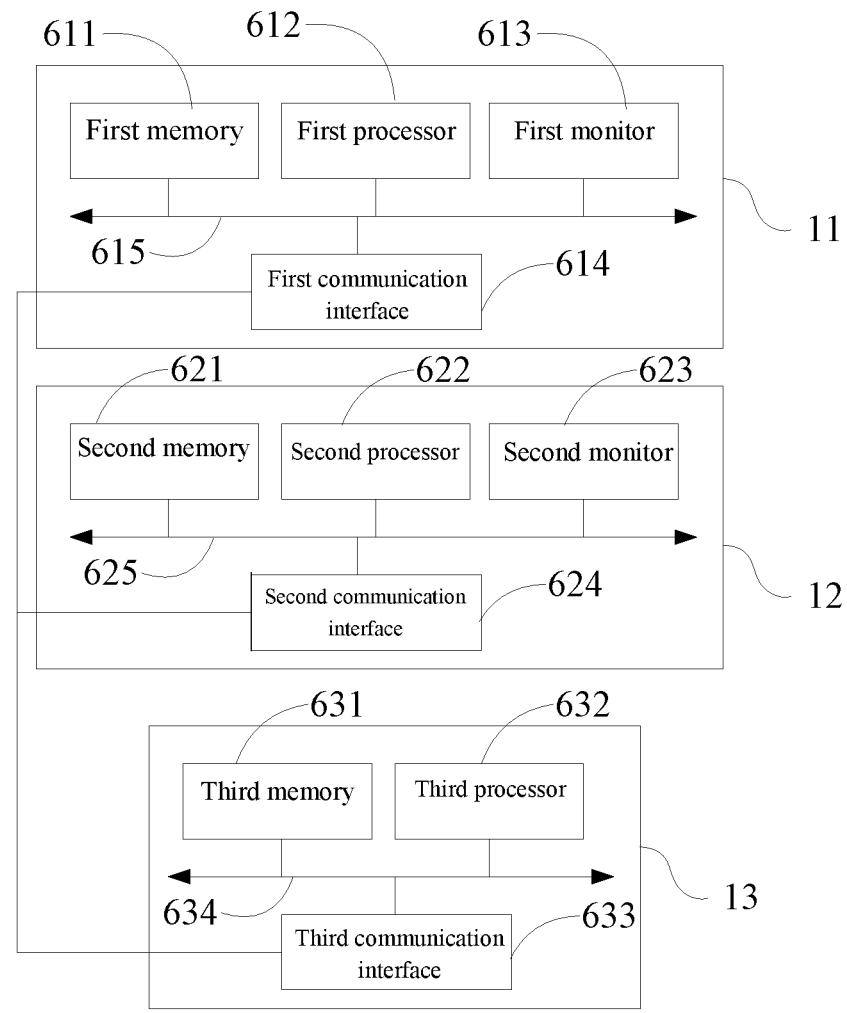
FIG. 6 is a structural schematic diagram of the hardware of the system for displaying wearable device display information according to an embodiment of the present invention.

FIG. 6 is a structural schematic diagram of the hardware of the system for displaying wearable device display information according to the present invention. As shown in FIG. 6, the display system comprises a master wearable device 11, a handheld terminal 13 and a slave wearable device 12, the master wearable device 11 being worn on the user body. The master wearable device 11 comprises a first bus 615 and a first memory 611, a first processor 612, a first communication interface 614, and a first monitor 613 that are connected to the first bus 615, respectively. The slave wearable device 12 comprises a second bus 625 and a second memory 621, a second processor 622, a second communication interface 624, and a second monitor 623 that are connected to the second bus 625, respectively. The handheld terminal 13 comprises a third bus 634 and a third memory 631, a third processor 632, and a third communication interface 633 that are connected to the third bus 634, respectively. The first memory 611 can store a first program command, the first processor 612 is configured to execute the first program command, the second memory 621 stores a second program command, the second processor 622 is configured to execute the second program command, the third memory 631 stores a third program command, and the third processor 632 is configured to execute the third program command.

The first communication interface 614 and the second communication interface 624 are both in contact with skin to ensure the openness of a body transmission channel. A first wireless communication link can be established between the first communication interface 614 and the third communication interface 633.

The first processor 612 can execute the first program command to control the first communication interface 614 to detect whether a user has put on the slave wearable device 12 via a body transmission channel formed within the user body; when the first processor 612 executes the first program command and determines that the user has put on the slave wearable device 12, the first communication interface 614 can acquire the device information of the slave wearable device 12 from the second communication interface 624 via the body transmission channel, and transmit the device information to the third communication interface 633 via the first wireless communication link.

The third processor 632 can execute the third program command, when the third communication interface 633 receives the device information, to establish a second wireless communication link between the third communication interface 633 and the second communication interface 624 according to the device information.

The third processor 632 can execute the third program command to determine priority of the master wearable device 11 and the slave wearable device 12, when the third processor 632 executes the third program command to determine that the priority of the slave wearable device 12 is higher than the priority of the master wearable device 11, the third communication interface 633 can transmit the display information to be displayed to the second communication interface 624 via the second wireless communication link.

The second processor 622 can execute the second program command such that the second monitor 623 displays the display information when the second communication interface 624 receives the display information.

When the first processor 612 executes the first program command and determines that the user has put on the slave wearable device 12, the first communication interface 614 further transmits handshake information to the second communication interface 624 regularly via the body transmission channel, the second processor 622 can execute the second program command such that the second communication interface 624 transmits answer information corresponding to the handshake information to the first communication interface 614 via the body transmission channel.

When the first processor 612 executes the first program command and when no corresponding answer information is received after the first communication interface 614 transmits the handshake information, the first processor 612 can confirm that the user has taken off the slave wearable device 12, when the first processor 612 confirms that the user has taken off the slave wearable device 12, the first communication interface 614 can transmit switching information to the third communication interface 633 via the first wireless communication link. The third processor 632 can execute the third program command to transmit the display information to be displayed to the first communication interface 614 via the first wireless communication link according to the switching information, and the first monitor 613 can display the display information.

The first wireless communication link and the second wireless communication link may be Bluetooth links, the master wearable device 11 may be a smart watch, and the slave wearable device 12 may be a pair of smart glasses.

In summary, the method for displaying wearable device display information of the present invention comprises: a master wearable device detects whether a user has put on a slave wearable device via a body transmission channel formed within the user body; when the master wearable device determines that the user has put on the slave wearable device, priority can be determined for the master wearable device and the slave wearable device, and when the priority of the slave wearable device is higher than the priority of the master wearable device, the display information to be displayed can be transmitted to the slave wearable device via the body transmission channel; the slave wearable device can display the display information on its own monitor. In the way described above, the present invention can automatically display display information on a wearable device having the highest priority, which greatly improves the flexibility of display for wearable devices and effectively improves the user experience.

Embodiments of the present invention are described above with reference to the accompanying drawings, which are not to limit the scope of the present invention. Any modification, equivalent substitution and improvement made by a person skilled in the art without departing from the scope and essence of the present invention shall be encompassed in the scope of the present invention.

The invention claimed is:

1. A system for displaying wearable device display information, comprising:
   a master wearable device;
   a handheld terminal; and
   a slave wearable device,
   wherein the master wearable device worn on a user body comprises a first bus, a first memory, a first processor, a first communication interface, and a first monitor,
   the first memory, the first processor, the first communication interface, and the first monitor being connected to the first bus,
   wherein the slave wearable device comprises a second bus, a second memory, a second processor, a second communication interface, and a second monitor,
   the second memory, the second processor, the second communication interface, and the second monitor being connected to the second bus, and
   wherein the handheld terminal comprises a third bus, a third memory, a third processor, and a third communication interface, the third memory, the third processor, and the third communication interface being connected to the third bus,
   the first memory storing a first program command, the first processor being configured to execute the first program command, the second memory storing a second program command, the second processor being configured to execute the second program command, the third memory storing a third program command, the third processor being configured to execute the third program command, and both the first communication interface and the second communication interface being in contact with skin to ensure the openness of a body transmission channel,
   wherein:
   a first wireless communication link is established between the first communication interface and the third communication interface;
   the first processor executes the first program command to control the first communication interface to detect whether a user has put on the slave wearable device via a body transmission channel formed within the user body;
   when the first processor executes the first program command and determines that the user has put on the slave wearable device, the first communication interface acquires the device information of the slave wearable device from the second communication interface via the body transmission channel, and transmits the device information to the third communication interface via the first wireless communication link;
   the third processor executes the third program command, when the third communication interface receives the device information, to establish a second wireless communication link between the third communication interface and the second communication interface according to the device information;
   the third processor executes the third program command to determine priority of the master wearable device and the slave wearable device;
   when the third processor executes the third program command to determine that the priority of the slave wearable device is higher than the priority of the master wearable device, the third communication interface transmits the display information to be displayed to the second communication interface via the second wireless communication link;
   the second processor executes the second program command such that the second monitor displays the display information when the second communication interface receives the display information;
   wherein, when the first processor executes the first program command and determines that the user has put on the slave wearable device, the first communication interface further transmits handshake information to the second communication interface regularly via the body transmission channel;
   the second processor executes the second program command such that the second communication interface transmits answer information corresponding to the handshake information to the first communication interface via the body transmission channel; and
   the first wireless communication link and the second wireless communication link are Bluetooth links.

2. The system according to claim 1, wherein,
   when the first processor executes the first program command and when no corresponding answer information is received after the first communication interface transmits the handshake information, the first processor confirms that the user has taken off the slave wearable device;
   when the first processor confirms that the user has taken off the slave wearable device, the first communication interface transmits switching information to the third communication interface via the first wireless communication link;

the third processor executes the third program command to transmit the display information to be displayed to the first communication interface via the first wireless communication link according to the switching information;

the first monitor displays the display information.

3. The system of claim 2, wherein the master wearable device is configured to determine that the user has put on the slave wearable device if the master wearable device receives answer information corresponding to the handshake information more than a preset number of times within a preset time.

4. The system according to claim 1, wherein the master wearable device is a smart watch, and the slave wearable device is a pair of smart glasses.

5. The system of claim 1, wherein the handheld terminal is a cell phone.

6. The system of claim 1, wherein the handheld terminal is configured to transmit the display information to the master wearable device.

7. A system for displaying wearable device display information, comprising:
a master wearable device;
a handheld terminal; and
a slave wearable device,
wherein the master wearable device worn on a user body comprises a first bus, a first memory, a first processor, a first communication interface, and a first monitor, the first memory, the first processor, the first communication interface, and the first monitor being connected to the first bus,
wherein the slave wearable device comprises a second bus, a second memory, a second processor, a second communication interface, and a second monitor, the second memory, the second processor, the second communication interface, and the second monitor being connected to the second bus, and
wherein the handheld terminal comprises a third bus, a third memory, a third processor, and a third communication interface, the third memory, the third processor, and the third communication interface being connected to the third bus,
the first memory storing a first program command, the first processor being configured to execute the first program command, the second memory storing a second program command, the second processor being configured to execute the second program command, the third memory storing a third program command, and the third processor being configured to execute the third program command,
wherein:
a first wireless communication link is established between the first communication interface and the third communication interface;
the first processor executes the first program command to control the first communication interface to detect whether a user has put on the slave wearable device via a body transmission channel formed within the user body;
when the first processor executes the first program command and determines that the user has put on the slave wearable device, the first communication interface acquires the device information of the slave wearable device from the second communication interface via the body transmission channel, and transmits the device information to the third communication interface via the first wireless communication link;

the third processor executes the third program command to, when the third communication interface receives the device information, establish a second wireless communication link between the third communication interface and the second communication interface according to the device information; the third processor executes the third program command to determine priority of the master wearable device and the slave wearable device;

when the third processor executes the third program command to determine that the priority of the slave wearable device is higher than the priority of the master wearable device, the third communication interface transmits the display information to be displayed to the second communication interface via the second wireless communication link;

the second processor executes the second program command such that the second monitor displays the display information when the second communication interface receives the display information.

8. The system according to claim 7, wherein, when the first processor executes the first program command and determines that the user has put on the slave wearable device, the first communication interface further transmits handshake information to the second communication interface regularly via the body transmission channel;

the second processor executes the second program command such that the second communication interface transmits answer information corresponding to the handshake information to the first communication interface via the body transmission channel.

9. The system according to claim 8, wherein, when the first processor executes the first program command and when no corresponding answer information transmitted by the second communication interface is received after the first communication interface transmits the handshake information, the first processor confirms that the user has taken off the slave wearable device;

when the first processor confirms that the user has taken off the slave wearable device, the first communication interface transmits switching information to the third communication interface via the first wireless communication link;

the third processor executes the third program command to transmit the display information to be displayed to the first communication interface via the first wireless communication link according to the switching information;

he first monitor displays the display information.

10. The system of claim 8, wherein the master wearable device is configured to determine that the user has put on the slave wearable device if the master wearable device receives answer information corresponding to the handshake information more than a preset number of times within a preset time.

11. The system according to claim 7, wherein the first wireless communication link and the second wireless communication link are Bluetooth links.

12. The system according to claim 7, wherein the master wearable device is a smart watch, and the slave wearable device is a pair of smart glasses.

13. The system of claim 7, wherein the handheld terminal is a cell phone.

14. A method for displaying wearable device display information, wherein said method is applied to a master wearable device, a handheld terminal, and a slave wearable device, the master wearable device being worn on a user body, and a first wireless communication link being established between the master wearable device and the handheld terminal, said method comprising:

the master wearable device detecting whether a user has put on the slave wearable device via a body transmission channel formed within the user body;

upon the master wearable device determining that the user has put on the slave wearable device, the master wearable device determining the device information of the slave wearable device from the slave wearable device via the body transmission channel, and transmitting the device information to the handheld terminal via the first wireless communication link;

upon receipt of the device information, the handheld terminal establishing a second wireless communication link with the slave wearable device according to the device information;

the handheld terminal determining priority of the master wearable device and the slave wearable device, and, when determining that the priority of the slave wearable device is higher than the priority of the master wearable device, transmitting the display information to be displayed to the slave wearable device via the second wireless communication link; and the slave wearable device displayiing the display information on its own monitor.

15. The method according to claim 14, wherein, when determining that the user has put on the slave wearable device, the master wearable device further transmits handshake information to the slave wearable device regularly via the body transmission channel, and the slave wearable device transmits answer information corresponding to the handshake information to the master wearable device via the body transmission channel.

16. The method according to claim 15, wherein, when no corresponding answer information is received after the master wearable device transmits the handshake information, the master wearable device confirms that the user has taken off the slave wearable device, and transmits switching information to the handheld terminal, the handheld terminal transmits the display information to be displayed to the master wearable device via the first wireless communication link according to the switching information, and the master wearable device displays the display information on its own monitor.

17. The method of claim 15, wherein the master wearable device is configured to determine that the user has put on the slave wearable device if the master wearable device receives the answer information corresponding to the handshake information more than a preset number of times within a preset time.

18. The method according to claim 14, wherein the first wireless communication link and the second wireless communication link are Bluetooth links.

19. The method according to claim 14, wherein the master wearable device is a smart watch, and the slave wearable device is a pair of smart glasses.

20. The method of claim 14, wherein the handheld terminal is a cell phone.

* * * * *